(12) United States Patent
Kowalchuk

(10) Patent No.: US 11,254,379 B2
(45) Date of Patent: Feb. 22, 2022

(54) TRANSPORT SYSTEM AND METHOD FOR AUTONOMOUS WORK VEHICLES

(71) Applicant: CNH Industrial Canada, Ltd., Saskatoon (CA)

(72) Inventor: Trevor Lawrence Kowalchuk, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 303 days.

(21) Appl. No.: 16/386,004

(22) Filed: Apr. 16, 2019

(65) Prior Publication Data
US 2020/0331547 A1 Oct. 22, 2020

(51) Int. Cl.
| | | |
|---|---|---|
| *B62D 61/12* | (2006.01) | |
| *B62D 59/04* | (2006.01) | |
| *B60K 1/02* | (2006.01) | |
| *B60D 1/54* | (2006.01) | |
| *B62D 63/02* | (2006.01) | |
| *B60D 1/00* | (2006.01) | |

(52) U.S. Cl.
CPC .............. *B62D 61/12* (2013.01); *B60D 1/54* (2013.01); *B60K 1/02* (2013.01); *B62D 59/04* (2013.01); *B62D 63/025* (2013.01); *B60D 2001/008* (2013.01)

(58) Field of Classification Search
CPC ...... B62D 61/12; B62D 59/04; B62D 63/025; B60K 1/02; B60K 1/00; B60K 2001/001; B60D 1/54; B60D 2001/008; B60D 1/62; B60D 1/481; B60Y 2200/22
See application file for complete search history.

(56) References Cited

U.S. PATENT DOCUMENTS

| | | |
|---|---|---|
| 3,409,311 A | 11/1968 | Layton |
| 4,082,157 A | 4/1978 | Sternberg |
| 4,725,068 A | 2/1988 | Taylor et al. |
| (Continued) | | |

FOREIGN PATENT DOCUMENTS

WO 2017142101 A2 8/2017

OTHER PUBLICATIONS

"Turnoverball: Your Towing Adventure Begins," BW Trailer Hitches, Accessed on Nov. 19, 2018, https://www.bwtrailerhitches.com/sites/default/files/documents/2018%20TOB%20Owners%20Manual%20WEB_0.pdf.

*Primary Examiner* — Minnah L Seoh
*Assistant Examiner* — Marlon A Arce
(74) *Attorney, Agent, or Firm* — Rebecca L. Henkel; Rickard K. DeMille

(57) ABSTRACT

An autonomous work vehicle having a chassis, a power system disposed on the chassis, a field wheel system coupled to the chassis and the power system, and a hitch assembly. The power system is configured to power the autonomous work vehicle in an autonomous control mode. The field wheel system is configured to drive the autonomous work vehicle in a field in the autonomous control mode. The hitch assembly is configured to couple to a lead vehicle in a transport mode. The autonomous work vehicle may engage wheels of a transportation wheel system with a road to support the autonomous work vehicle on the road. The autonomous work vehicle may be coupled via the hitch assembly to the lead vehicle, then transported on a road. A brake system of the transportation wheel system may be coupled to the lead vehicle.

20 Claims, 4 Drawing Sheets

(56) References Cited

U.S. PATENT DOCUMENTS

| | | | |
|---|---|---|---|
| 5,108,123 A | 4/1992 | Rubenzik | |
| 5,421,612 A | 6/1995 | Floe | |
| 5,559,696 A * | 9/1996 | Borenstein | G01C 21/12 701/23 |
| 5,707,072 A | 1/1998 | Hopper | |
| 5,988,974 A | 11/1999 | Zackovich | |
| 7,871,097 B2 | 1/2011 | Sparkes et al. | |
| 8,684,373 B2 * | 4/2014 | Holtan | B62B 3/00 280/47.11 |
| 8,876,139 B2 | 11/2014 | Duvall et al. | |
| 8,992,155 B2 | 3/2015 | Meenen et al. | |
| 9,037,322 B2 | 5/2015 | Fortin et al. | |
| 9,386,748 B2 | 7/2016 | Cook et al. | |
| 9,669,857 B1 * | 6/2017 | Rainey | B62B 5/06 |
| 10,646,993 B1 * | 5/2020 | Wiley | B25J 9/042 |
| 2004/0075242 A1 | 4/2004 | Richards | |
| 2010/0025964 A1 * | 2/2010 | Fisk | B62D 13/04 280/444 |
| 2010/0327674 A1 * | 12/2010 | Marsh | H02K 5/20 310/44 |
| 2011/0121541 A1 * | 5/2011 | Yamano | B60D 3/00 280/515 |
| 2012/0211302 A1 | 8/2012 | Stewart | |
| 2013/0187361 A1 | 7/2013 | Fortin et al. | |
| 2015/0083509 A1 * | 3/2015 | Borroni-Bird | B60W 10/20 180/204 |
| 2016/0368464 A1 * | 12/2016 | Hassounah | B60L 53/80 |
| 2018/0281178 A1 * | 10/2018 | Jacobsen | B25J 5/007 |
| 2019/0064795 A1 * | 2/2019 | Berggren | B60D 1/62 |
| 2020/0370998 A1 * | 11/2020 | Amacker | B60G 17/00 |

\* cited by examiner

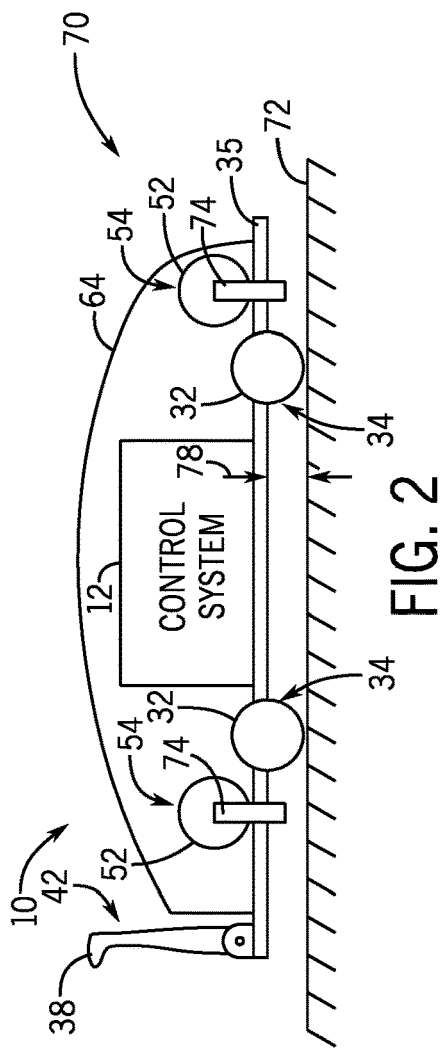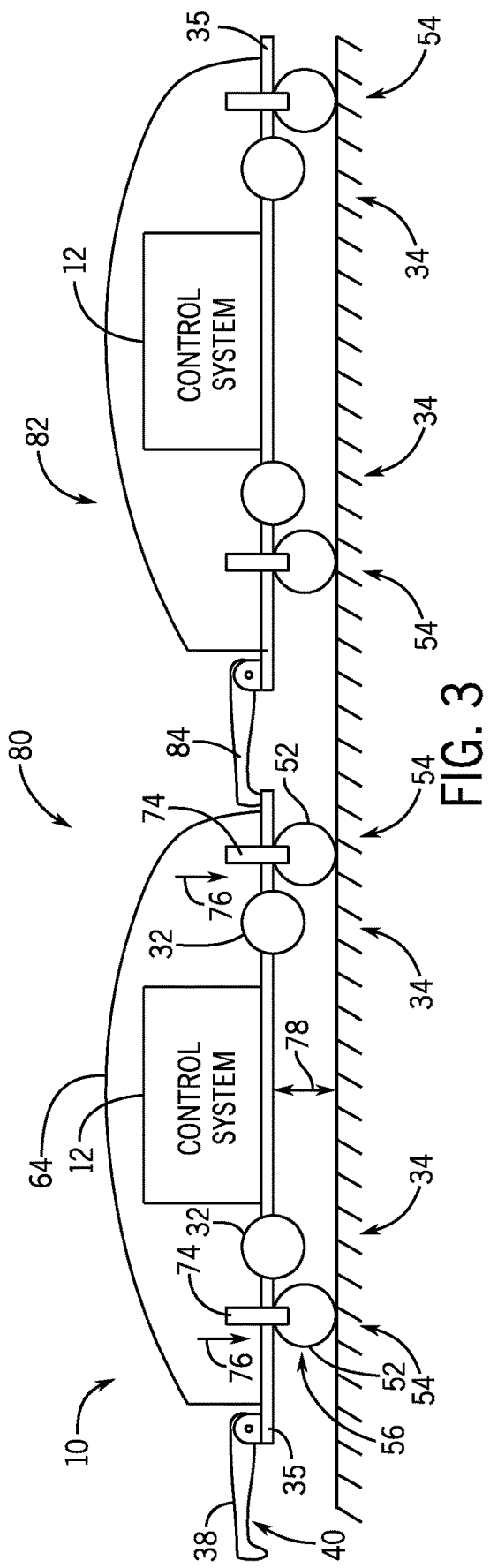

TRANSPORT SYSTEM AND METHOD FOR AUTONOMOUS WORK VEHICLES

BACKGROUND

The present disclosure relates generally to autonomous work vehicles for agricultural operations, and more particularly to the movement of autonomous work vehicles between fields.

Increasing productivity of agricultural operations may be achieved by increasing efficiency of agricultural vehicles and/or other machines involved with agricultural operations. Autonomous work vehicles may increase the efficiency of some aspects of performing agricultural operations, such as reducing the time an operator is in the field and increasing the available time for other activities by the operator. Some autonomous work vehicles may be operated in numerous fields. However, local rules and regulations for public roads between fields may reduce or prohibit the autonomous use of the autonomous work vehicle on the public road. Transporting the autonomous work vehicle between fields via a trailer increases the time, equipment, and costs associated with operating the autonomous work vehicle.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

A first embodiment describes an autonomous work vehicle having a chassis, a power system disposed on the chassis, a field wheel system coupled to the chassis and the power system, and a hitch assembly. The power system is configured to power the autonomous work vehicle in an autonomous control mode. The field wheel system is configured to drive the autonomous work vehicle in a field in the autonomous control mode. The hitch assembly is configured to couple to a lead vehicle in a transport mode.

A second embodiment describes an autonomous work vehicle having a chassis, a field wheel system coupled to the chassis, a transportation wheel system coupled to the chassis, and a first hitch assembly configured to couple to a lead vehicle in the transport mode. The field wheel system is configured to support the autonomous work vehicle in a field in an autonomous control mode. The transportation wheel system is configured to support the autonomous work vehicle on a road in a transport mode. The transportation wheel system includes a retractable wheel system configured to be arranged in a storage position and a ground engaging position. The retractable wheel system is arranged in the storage position when the autonomous work vehicle is in the autonomous control mode, and is arranged in the ground engaging position when the autonomous work vehicle is in the transport mode. The first hitch assembly includes a retractable hitch assembly that is arranged in a retracted position in the autonomous control mode, and in an extended position in the transport mode.

A third embodiment describes a method of transporting an autonomous work vehicle. The method includes engaging wheels of a transportation wheel system of the autonomous work vehicle with a road to support the autonomous work vehicle on the road, coupling a hitch assembly of the autonomous work vehicle to a lead vehicle, and transporting, via the lead vehicle and the hitch assembly, the autonomous work vehicle on a road. Coupling the hitch assembly to the lead vehicle includes coupling a brake system of the transportation wheel system to the lead vehicle.

DRAWINGS

These and other features, aspects, and advantages of the present disclosure will become better understood when the following detailed description is read with reference to the accompanying drawings in which like characters represent like parts throughout the drawings, wherein:

FIG. 2 is an embodiment of the autonomous work vehicle in an autonomous control mode;

FIG. 3 is an embodiment of the autonomous work vehicle in a transportation mode;

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

It may be desirable to have a multipurpose vehicle, such as a multipurpose work vehicle, that may share a common set of components yet provide for reconfigurable components, such as power units, including "plug-and-play" power capabilities, suitable for powering a variety of operations and missions. The multipurpose vehicle may include an autonomous embodiment. The autonomous work vehicle may tow and/or power an agricultural implement across a field for one or more agricultural operations such as planting, seeding, spraying, tillage, harvest, and so forth. In some embodiments, the autonomous work vehicle itself may execute one or more agricultural operations without a separate agricultural implement. After operations in a first field are complete, an operator may move the autonomous work vehicle to a second field. Embodiments of the autonomous work vehicle hitch assembly described herein may facilitate operator transport of the autonomous work vehicle between fields with a lead vehicle without the use of a separate trailer to transport the autonomous work vehicle. Moreover, embodiments of the autonomous work vehicle include safety systems (e.g., lights, brakes) to facilitate transportation of the autonomous work vehicle on roads in compliance with transportation laws and regulations. In some embodiments, the autonomous work vehicle may include a transportation wheel system separate from a field wheel system.

Figure 1:
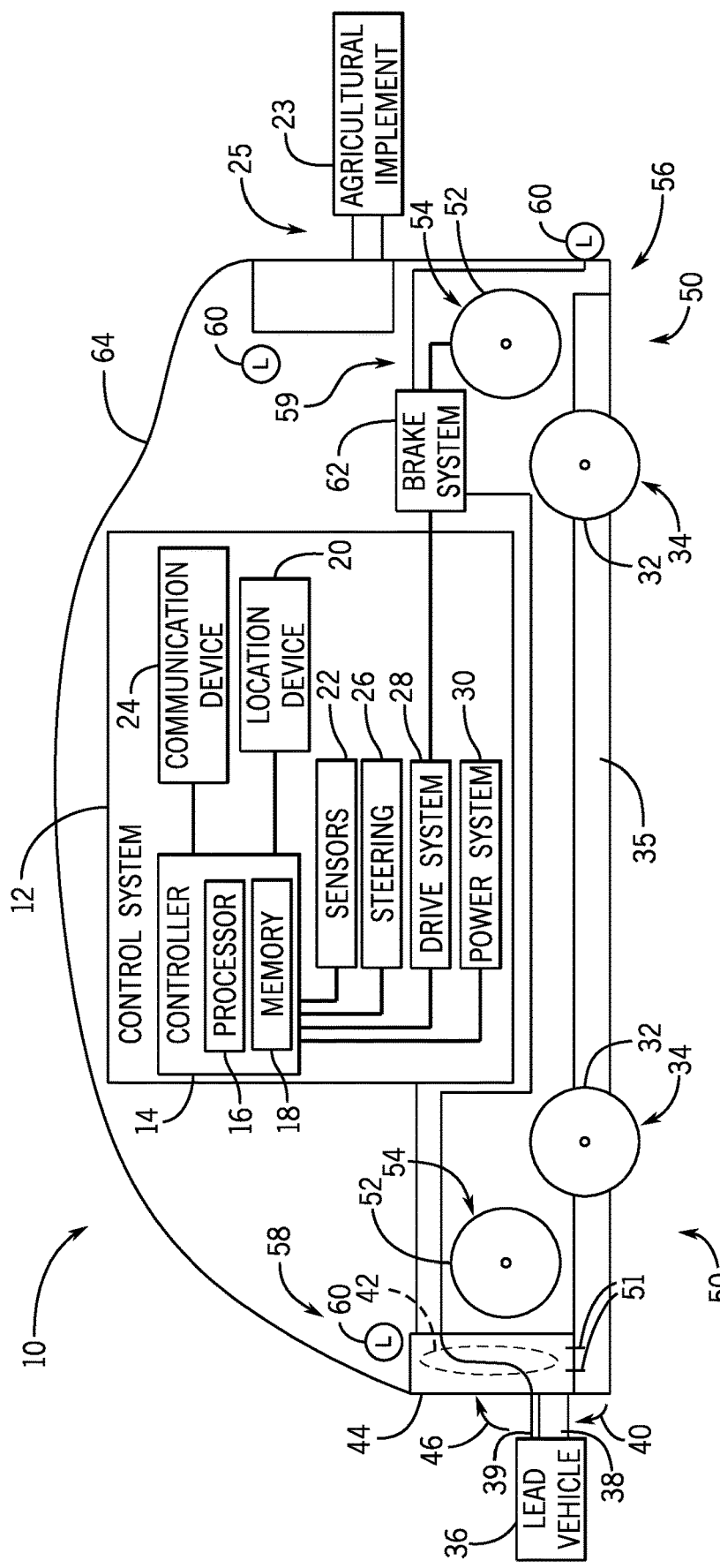
FIG. 1 is a diagram of an autonomous work vehicle, in accordance with an embodiment of the present disclosure.

Turning now to FIG. 1, the figure is a diagram of an autonomous work vehicle 10, in accordance with an embodiment of the present disclosure. It should be appreciated that while the illustrated embodiment includes the autonomous work vehicle 10 that may tow an agricultural implement, the present disclosure contemplates any autonomous vehicle suitable for agricultural use, such as a hauling vehicle, transport vehicle, delivery vehicle, loading and/or unloading vehicle, and the like.

The autonomous work vehicle 10 includes a control system 12 having a controller 14. The controller 14 includes a processor 16 (e.g., a microprocessor) that may execute software, such as software for controlling the autonomous work vehicle 10. Moreover, the processor 16 may include multiple microprocessors, one or more "general-purpose" microprocessors, one or more special-purpose microprocessors, and/or one or more application specific integrated circuits (ASICS), or some combination thereof. For example, the processor 16 may include one or more reduced instruction set (RISC) processors. The controller 14 includes a memory device 18 that may store information such as control software, look up tables, configuration data, etc. In some embodiments, the controller 14 may be coupled to the memory device 18. The memory device 18 may include a volatile memory, such as random access memory (RAM), and/or a nonvolatile memory, such as read-only memory (ROM). The memory device 18 may store a variety of information and may be used for various purposes. For example, the memory device 18 may store processor-executable instructions (e.g., firmware or software) for the processor 16 execute, such as instructions for controlling the autonomous work vehicle 10. In some embodiments, the memory device 18 is a tangible, non-transitory, machine-readable-medium that may store machine-readable instructions for the processor 16 to execute. The memory device 18 may include ROM, flash memory, a hard drive, or any other suitable optical, magnetic, or solid-state storage medium, or a combination thereof. The memory device 18 may store data (e.g., position data, identification data, etc.), instructions (e.g., software or firmware for controlling the autonomous work vehicle 10, etc.), any other suitable data, or a combination thereof. For example, the memory device 18 may store a harvesting map, a harvesting plan, a seeding map, a seeding plan, a distribution map, a distribution plan, or any plan suitable for being followed autonomously in a respective field by the autonomous work vehicle 10.

The controller 14 is communicatively coupled to a location device 20 that is configured to determine a position of the autonomous work vehicle 10. As will be appreciated, the location device 20 may include any suitable system configured to determine the position of the autonomous work vehicle 10, such as a global positioning system (GPS), for example. In certain embodiments, the location device 20 may be configured to determine the position of the autonomous work vehicle 10 relative to a fixed point within the field (e.g., via a fixed radio transceiver). Accordingly, the autonomous work vehicle 10 may be configured to determine the position of the autonomous work vehicle 10 relative to a fixed global coordinate system (e.g., via the GPS) or a fixed local coordinate system. In some embodiments, the location device 20 may enable the controller 14 to determine a speed of the autonomous work vehicle 10 during operation.

The controller 14 is communicatively coupled to one or more sensors 22, such as a speed sensor, a proximity sensor, a terrain sensor, a weight sensor, a fill sensor, a load sensor, a torque sensor, etc. The speed sensor may enable the controller 14 to determine a speed of the autonomous work vehicle 10 during operation. The weight sensor may enable the controller 14 to determine a weight of the autonomous work vehicle 10 and contents of the autonomous work vehicle 10. The fill sensor may enable the controller 14 to determine a depth of the contents (e.g., grain) of the autonomous work vehicle 10. The proximity sensor may enable the controller 14 to detect nearby objects or vehicles relative to the autonomous work vehicle 10. The terrain sensor may enable the controller 14 to determine aspects of the terrain under and/or adjacent to the autonomous work vehicle 10. For example, the terrain sensor may enable the autonomous work vehicle 10 to detect rough and bumpy terrain, smooth terrain, muddy terrain, and the like. In some embodiments, the terrain sensor is configured to output a signal indicative of at least one property of terrain to the autonomous work vehicle 10. The load sensor may enable the controller 14 to determine a load on the autonomous work vehicle 10, such as from the agricultural implement 23 coupled to the autonomous work vehicle 10 via an implement hitch assembly 25. The torque sensor may enable the controller 14 to determine a torque on an engine of the autonomous work vehicle 10, a torque on a power take-off (PTO) of the autonomous work vehicle, or any combination thereof.

The controller 14 is communicatively coupled to a communication device 24 that enables the controller 14 to send and receive information over a communication network, such as a wireless communication network. For example, the communication device 24 may enable the controller 14 to receive information about agricultural and other equipment, such as location information received from the location device 20 of the equipment. Advantageously, the use of the autonomous work vehicles 10 may reduce operator and vehicle costs, for example, as when compared to planting or harvesting grain via an operator-driven tractor or work vehicle.

The controller 14 also includes a steering system 26 configured to steer, navigate, and/or orient the autonomous work vehicle 10. The controller 14 is communicatively coupled to a drive system 28 configured to propel, accelerate, and/or decelerate the autonomous work vehicle 10. The drive system 28 may be mechanically, hydraulically, and/or electrically coupled to a power unit or system 30, for example to receive power from the power unit 30 suitable for moving wheels 32 of a field wheel system 34. The field wheel system 34 is coupled to a chassis 35 of the autonomous work vehicle 10 to support the autonomous work vehicle 10 across the field. A variety of drive systems 28 and/or power systems 30 may be attached onto the chassis 35 of the autonomous work vehicle 10. For example, certain operations may have natural gas and/or biogas more easily available, and so gas power supplies may be provided for the power system 30. Other operations may prefer to use electrical power for the power system 30 based on solar panel availability for recharge. In some embodiments, the drive system 28 may include one or more electric drive motors, such as an electric drive motor per wheel 32 or axle of the field wheel system 34 that are driven by electrical power from the power system 30. Yet other operations may desire to use traditional carbonaceous fuels such as gasoline and diesel for the power system 30. The power system 30 for other missions may use hydraulic power, hydrostatic power, compressed air, and so on. By selecting certain drive systems 28 and/or power systems 30, the autonomous work vehicle 10 may be configured to provide for a more efficient, maintainable, and lower cost autonomous vehicle suitable for a variety of operational tasks.

The autonomous work vehicle 10 may be built in various sizes and dimensions. For example, for agricultural grain cart applications, the autonomous work vehicle 10 may be dimensioned such that the autonomous work vehicle 10 may fit between an end of a header of a combine and a closer, nearer, or proximal lateral side of the combine. As discussed herein the autonomous work vehicle 10 may be transported to and/or from a field on a road via coupling the autonomous work vehicle 10 to a lead vehicle 36. To accommodate transporting the autonomous work vehicle on roads, the chassis 35 of the autonomous work vehicle 10 may be sized to comply with local transportation laws or regulations on the height, width, weight, and axle spacing, among other factors. As discussed herein, the components of some embodiments of the autonomous work vehicle 10 may be retractable, thereby enabling transportation of the autonomous work vehicle 10 in compliance with the local transportation laws or regulations when the components (e.g., arms, row units, field wheel systems) are in the retracted positions.

A towing hitch assembly 38 is configured to couple the autonomous work vehicle 10 to the lead vehicle 36 for transport. In some embodiments, the towing hitch assembly 38 is retractable from a towing position 40 to a hitch storage position 42, as shown by arrow 46. In some embodiments, the towing hitch assembly 38 may be stored in a hitch assembly housing 44 coupled to the chassis 35. The towing hitch assembly 38 may be configured to couple with one or more types of hitches of the lead vehicle, such as a pull hitch, a fifth-wheel hitch, or a gooseneck hitch. In some embodiments, the towing hitch assembly 38 is a detachable hitch system configured to be attached to the chassis 35 with a plurality of fasteners 51 in a transportation mode of the autonomous work vehicle 10, and configured to be detached from the chassis 35 in an autonomous control mode of the autonomous work vehicle 10. In some embodiments, the towing hitch assembly 38 may be tilted or pivoted from a towing position to a storage position, such as via a mechanical, hydraulic, or electric coupling with the chassis 35 of the autonomous work vehicle 10. In the storage position, the towing hitch assembly 38 have a reduced profile relative to the towing position. As discussed in detail below, the autonomous work vehicle 10 may be configured to operate in an autonomous control mode apart from the lead vehicle 36. The lead vehicle 36 is a vehicle that may travel along public roads while towing wheeled vehicles or trailers. The lead vehicle 36 may include, but is not limited to a commercial truck, a semi-truck, or an agricultural tractor, among others. An electrical connector 39 of the towing hitch assembly 38 may electrically connect the lead vehicle 36 to the control system 12 and/or to a brake system 62 of the autonomous work vehicle 10. The lead vehicle 36 may transport the autonomous work vehicle 10 via the towing hitch assembly 38 on a public road or a private road. In some embodiments, the wheels 32 of the field wheel system 34 facilitate transportation of the autonomous work vehicle 10 in the field and on the road.

A transportation wheel system 50 coupled to the chassis 35 may have transportation wheels 52 that facilitate transportation of the autonomous work vehicle 10 on a public road. Although FIG. 1 illustrates the autonomous work vehicle 10 with two sets of transportation wheels 52, some embodiments of the autonomous work vehicle 10 may have one set of transportation wheels 52, more than two sets of transportation wheels 52, or no sets of transportation wheels 52. In some embodiments, the transportation wheel system 50 is a detachable system configured to be attached to the chassis 35 for transportation of the autonomous work vehicle 10 between fields in the transportation mode, and configured to be detached from the chassis 35 when the autonomous work vehicle 10 is to operate in an autonomous control mode. In some embodiments, the transportation wheels 52 have a higher speed rating than the field wheels 32 of the field wheel system 34. For example, the transportation wheels 52 may have a speed rating greater than 15, 20, 25, 35, 45, 55, or 70 or more miles per hour. The field wheels 32 of the field wheel system 34 may have a speed rating less than 25, 20, 15, 10, or less miles per hour.

The field wheel system 34 may have one or more retractable wheels 32 that may be arranged alternatively in a storage position and a ground engaging position. Additionally, or in the alternative, the transportation wheel system 50 may have one or more retractable wheels that may be arranged alternatively in a wheel storage position 54. For example, FIG. 1 illustrates an embodiment of the transportation wheel system 50 with the wheels 52 in the wheel storage position 54 shown. As discussed in detail below, adjustment of one of the wheel systems from the wheel storage position 54 to the ground-engaging position may engage the wheels of that respective wheel system with the ground (e.g., field, road), and may disengage the wheels of the other wheel system from the ground.

Local transportation rules and regulations may establish requirements for powered and towed vehicles on public roads. However, vehicles arranged on a trailer to be towed by a lead vehicle may have fewer or different rules and regulations for transport. A lighting system 58 of the autonomous work vehicle 10 may include one or more lights 60. The one or more lights 60 may be powered by the power system 30, the lead vehicle via the hitch assembly 38, or any combination thereof. The one or more lights 60 may include, but are not limited to running lights, turn signals, and/or brake lights. The lighting system 60 may respond to a lighting signal received from the control system 12 of the autonomous work vehicle 10 and/or to a lighting signal received from the lead vehicle 36 coupled via the hitch assembly 38. The brake system 62 of the autonomous work vehicle 10 may include brakes coupled to the wheels that are engaged with the ground when the autonomous work vehicle 10 is in a transport mode on the public road. In some embodiments, the transportation wheel system 50 may have brakes controlled by the brake system 62, yet the field wheel system 34 may not be coupled or controlled by the brake system 62 when the autonomous work vehicle 10 is in the autonomous control mode. In some embodiments, the one or more wheels are driven by electric drive motors in the transport mode, and the brake system 62 is configured to control the electric drive motors as brakes to decelerate the autonomous work vehicle 10 as desired. In some embodiments, such as embodiments of the autonomous work vehicle with a mechanical or hydraulic power system 30 configured to drive the one or more wheels, the brake system 62 may be a friction brake system configured to decelerate the autonomous work vehicle as desired. The brake system 62 may be coupled to one or more lights 60 of the lighting system 58 to turn ON the respective lights when the brake system 62 engages the brakes, and to turn OFF the respective lights when the brake system 62 disengages the brakes. The autonomous work vehicle 10 may operate in an autonomous control mode in a field with different lighting configurations or braking systems than the autonomous work vehicle 10 may operate with while in the transportation mode on public roads. The brake system 62 may respond to a brake signal received from the control system 12 of the autonomous work vehicle and/or to a brake signal received from the lead vehicle 36 coupled via the hitch assembly 38. The brake signal from the lead vehicle 36 may be an electrical signal or an inertial input that is based on relative movement between the autonomous work vehicle 10 and the lead vehicle 36.

The chassis 35 of the autonomous work vehicle 10 may have features that facilitate travel on public roads in the transportation mode at higher speeds than in the field, such as weight distribution and/or axle spacing. Moreover the chassis 35 of the autonomous work vehicle 10 configurable in the transportation mode may have a length and a width in compliance with local transportation rules and regulations. Furthermore, a body 64 of the autonomous vehicle 10 may have dimensions and features in compliance with local transportation rules and regulations for travel on public roads.

FIG. 2 illustrates an embodiment of the autonomous work vehicle 10 in an autonomous control mode 70 with wheels 32 of the field wheel system 34 engaging a ground 72 (e.g., field, road). The field wheel system 34 is configured to support the chassis 35 on the ground 72 in the autonomous control mode 70. In the autonomous control mode 70, the control system 12 may control the field wheel system 34 of the autonomous work vehicle 10 to move within a field. The hitch assembly 38 may be in the hitch storage position 42. In the autonomous control mode 70, the wheels 52 of the transportation wheel system 50 may be arranged in the wheel storage position 54 such that the wheels are disengaged from the ground 72. As discussed above, the field wheel system 34 and/or the transportation wheel system 50 may have one or more retractable wheels that may be arranged alternatively in a storage position and a ground engaging position. For example, the retractable wheels of the transportation wheel system 50 may be configured to rotate and/or extend from the wheel storage position 54 to a ground engaging position 56. In some embodiments, the transportation wheels 52 may be disposed on an arm 74 coupled to the chassis 35 to facilitate movement between the wheel storage position 54 and the ground engaging position 56.

FIG. 3 illustrates an embodiment of the autonomous work vehicle 10 in a transportation mode 80 with wheels 52 of the transportation wheel system 50 engaging the ground 72. The transportation wheel system 50 in a ground engaging position 56 is configured to support the chassis 35 on the ground 72, such as via extended arms 74 of a retractable wheel system. The wheels 52 of the transportation wheel system 50 may be extended along the arms 74 as shown by arrows 76 to engage with the ground 72 and support the autonomous work vehicle 10. Additionally, or in the alternative, the wheels 32 of the field wheel system 34 may be retracted in the transportation mode 80 to disengage with the ground 72 and facilitate engagement of the wheels 52 with the ground 72. The wheels 32, 52 of a retractable wheel system may be extended from the chassis 35 via a pneumatic system, a hydraulic system, a mechanical suspension system, or any combination thereof. In some embodiments, a ground clearance 78 between the chassis 35 and the ground 72 may be different in the autonomous control mode 70 than with the transportation mode 80. For example, a greater ground clearance 78 in the autonomous control mode 70 may facilitate greater autonomy of the autonomous work vehicle 10 in the field with more irregular terrain than a paved public road.

In the transportation mode 80, the autonomous work vehicle 10 may be towed on a public road and in a field via the hitch assembly 38 coupled to the lead vehicle, as described above with FIG. 1. The hitch assembly 38 may be arranged in the towing position 40 (e.g., extended position) to couple with the lead vehicle. In some embodiments, a second autonomous work vehicle 82 may be coupled to the autonomous work vehicle 10 via a second hitch assembly 84. The second hitch assembly 84 of the second autonomous work vehicle 82 may be coupled to the chassis 35 opposite the hitch assembly 38. The second autonomous work vehicle 82 may have one or more features (e.g., retractable wheel systems 34, 50, hitch assembly 38, control system 12, lighting system 58, brake system 62) that are similar to the autonomous work vehicle 10 described above. The second autonomous work vehicle 82 may have a respective transportation wheel system 50 to accommodate towing on public roads. For example, the second autonomous work vehicle 82 may have a respective transportation wheel system 50, a respective lighting system 58, and a respective brake system 62. Accordingly, two or more autonomous work vehicles 82 may be towed in tandem by the lead vehicle on public roads without a trailer.

Figure 4:
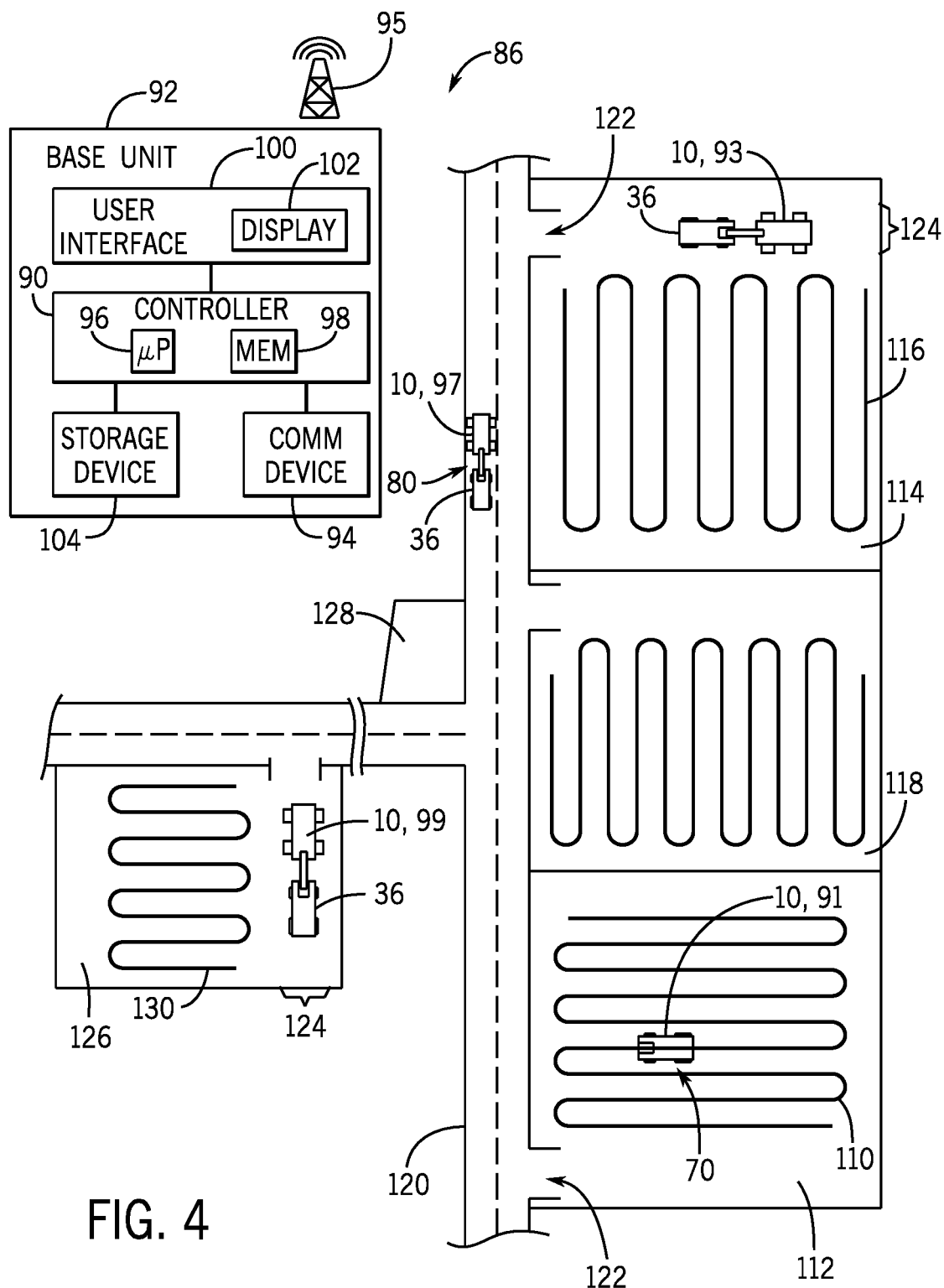
FIG. 4 is an embodiment of a system of autonomous work vehicles and a base unit illustrating autonomous work vehicles in the autonomous control mode and the transportation mode.

FIG. 4 illustrates an embodiment of an autonomous control system 86 with multiple autonomous work vehicles 10 being utilized in the autonomous control mode 70 and the transportation mode 80 described above. A first autonomous work vehicle 91 is shown operating in the autonomous control mode 70 to follow a plan 110 in a first field 112. The first autonomous work vehicle 91 may power itself across the first field 112 to perform one or more agricultural operations such as planting, seeding, spraying, tillage, harvest, and so forth. In some embodiments, the first autonomous work vehicle 91 is coupled to an agricultural implement 23 to perform the one or more agricultural operations.

In the illustrated embodiment, the control system 12 of the first autonomous work vehicle 91 may communicate with a controller 90 of a base unit 92. The communication device of the autonomous work vehicle 10 is configured to establish a communication link with a corresponding communication device 94 of the base unit 92, thereby facilitating communication between the base unit 92 and the control system 12 of the autonomous work vehicle 10. In some embodiments, the communication device 94 communicates with the one or more autonomous vehicles 10 via a tower 95 or satellite communication system. The communication device 94 may operate at any suitable frequency range within the electromagnetic spectrum. For example, in certain embodiments, the communication device 94 may broadcast and receive radio waves within a frequency range of about 1 GHz to about 10 GHz. In addition, the communication device 94 may utilize any suitable communication protocol, such as a standard protocol (e.g., Wi-Fi, Bluetooth, etc.) or a proprietary protocol.

In the illustrated embodiment, the base unit 92 includes the controller 90 communicatively coupled to the communication device 94. The controller 90 is configured to output commands and/or data to the control system 12 of one or more autonomous work vehicles 10 of a fleet of autonomous work vehicles in an area/region. For example, the controller 90 may be configured to determine plans (e.g., routes, patterns) for multiple fields and to output one or more signals indicative of the plans to the control systems 12 of autonomous work vehicles 10 for each field. Upon loading the respective plan for a field, the control system 12 may instruct the drive system 28 and steering system 26 to direct the respective autonomous work vehicle 10 along a route of the plan.

In certain embodiments, the controller 90 of the base unit 92 is an electronic controller having electrical circuitry configured to process data from certain components of the base unit 92 (e.g., the communication device 94). In the illustrated embodiment, the controller 90 includes a processor 96, such as the illustrated microprocessor, and a memory device 98. The processor 96 may be used to execute software, such as software for determining a plan, and so forth. Moreover, the processor 96 may include multiple microprocessors, one or more "general-purpose" microprocessors, one or more special-purpose microprocessors, and/or one or more application specific integrated circuits (ASICS), or some combination thereof. For example, the processor 96 may include one or more reduced instruction set (RISC) processors. The memory device 98 may include a volatile memory, such as RAM, and/or a nonvolatile memory, such as ROM. The memory device 98 may store a variety of information and may be used for various purposes. For example, the memory device 98 may store processor-executable instructions (e.g., firmware or software) for the processor 96 to execute, such as instructions for determining a plan.

In the illustrated embodiment, the base unit 92 includes a user interface 100 communicatively coupled to the controller 90. The user interface 100 is configured to present data from the autonomous work vehicle and/or the agricultural implement to an operator (e.g., data associated with operation of the autonomous work vehicle, data associated with operation of the agricultural implement, etc.). The user interface 100 is also configured to enable an operator to control certain functions of the autonomous work vehicle (e.g., starting and stopping the autonomous work vehicle, instructing the autonomous work vehicle to follow a route or pattern through the field, etc.). In the illustrated embodiment, the user interface includes a display 102 configured to present information to the operator, such as the position of the autonomous work vehicle system within the field, the speed of the speed of the autonomous work vehicle system, and the path of the autonomous work vehicle system, among other data.

In the illustrated embodiment, the base unit 92 includes a storage device 104 communicatively coupled to the controller 90. The storage device 104 (e.g., nonvolatile storage) may include ROM, flash memory, a hard drive, or any other suitable optical, magnetic, or solid-state storage medium, or a combination thereof. The storage device(s) may store data, instructions (e.g., software or firmware for determining a plan, etc.), and any other suitable data. In certain embodiments, the control system may include additional controllers/control systems, such as the implement controller/control system discussed above. The autonomous work vehicle control system 12 may also include controller(s)/control system(s) for electrohydraulic remote(s), power take-off shaft(s), adjustable hitch(es), or a combination thereof, among other controllers/control systems.

The controller 90 of the base unit 92 may be configured to determine a plan for the autonomous work vehicle 10 by reducing a cost function, distance travelled, or field compression, and so forth. The plan includes a route (e.g., pattern) through the field for the autonomous work vehicle 10, and the route may include multiple swaths (e.g., parallel swaths) and corresponding paths between the swaths (e.g., headland turns). Upon completion of the plan 110, the autonomous work vehicle 10 may be available for storage or to perform one or more agricultural operations in another field. In some situations, the autonomous work vehicle 10 may be able to autonomously power itself between fields to plans for agricultural operations in respective fields. However, structures (e.g., fencing, buildings, property owned by another) or field conditions may reduce the availability of the autonomous work vehicle to power itself between fields apart from transportation on public roads. For example, the first field 112 may be separated from a second field 114 by a third field 118, such that the first autonomous work vehicle 91 may travel along a public road 120 between entrances 122 of the respective fields.

A second autonomous work vehicle 93 is shown in the second field 114 after completing a second plan 116. Upon completion of the second plan 116, the second autonomous work vehicle 93 may position itself in a loading area (e.g., headland) of the second field 114. In the loading area 124, the second autonomous work vehicle 93 may transition from the autonomous control mode 70 to the transportation mode 80 described above. In some embodiments, the autonomous work vehicle 10 may transition between the autonomous control mode 70 and the transportation mode 80 autonomously (e.g., without interaction by an operator). In some embodiments, an operator may removably attach the hitch assembly and/or the transportation wheel system to transition the autonomous work vehicle to the transportation mode 80. The lead vehicle 36 (e.g., truck, tractor) couples to the second autonomous work vehicle 93 via the hitch assembly of the autonomous work vehicle 10 without a trailer. When the second autonomous vehicle 93 is in the transportation mode 80 and is coupled to the lead vehicle 36, the lead vehicle 36 may tow the second autonomous work vehicle 93 from the loading area 124 to the public road 120, then to another location, such as a fourth field 126 or a storage location 128. FIG. 4 illustrates with reference number 97 the second autonomous work vehicle in the transportation mode 80 while the second autonomous work vehicle is towed by the lead vehicle 36. Through towing the autonomous work vehicle 97 on the public road 120 without a trailer, the second autonomous work vehicle 97 may be more readily moved and utilized among the fields than an autonomous work vehicle loaded on a trailer.

Upon arrival to the fourth field 126 in the transportation mode 80, the second autonomous work vehicle 93 may be uncoupled from the lead vehicle 36 in the loading area 124 of the fourth field 126. For clarity, FIG. 4 illustrates the second work vehicle 93, 97 in the fourth field 126 with reference number 99. The second autonomous work vehicle 99 may then transition from the transportation mode 80 to the autonomous control mode 70. In some embodiments, the autonomous work vehicle may transition autonomously from the transportation mode 80 to the autonomous control mode 70. In some embodiments, the operator may remove the hitch assembly, adjust the transportation wheel system, adjust the field wheel system, or any combination thereof to effect the transition to the autonomous control mode 70. In some embodiments, the second autonomous work vehicle 99 may communicate with the base unit 92 to receive a fourth plan 130 for one or more agricultural operations in the fourth field 126. In the autonomous control mode 70, the second autonomous work vehicle 99 may power itself across the fourth field 126 to execute the fourth plan 130.

Figure 5:
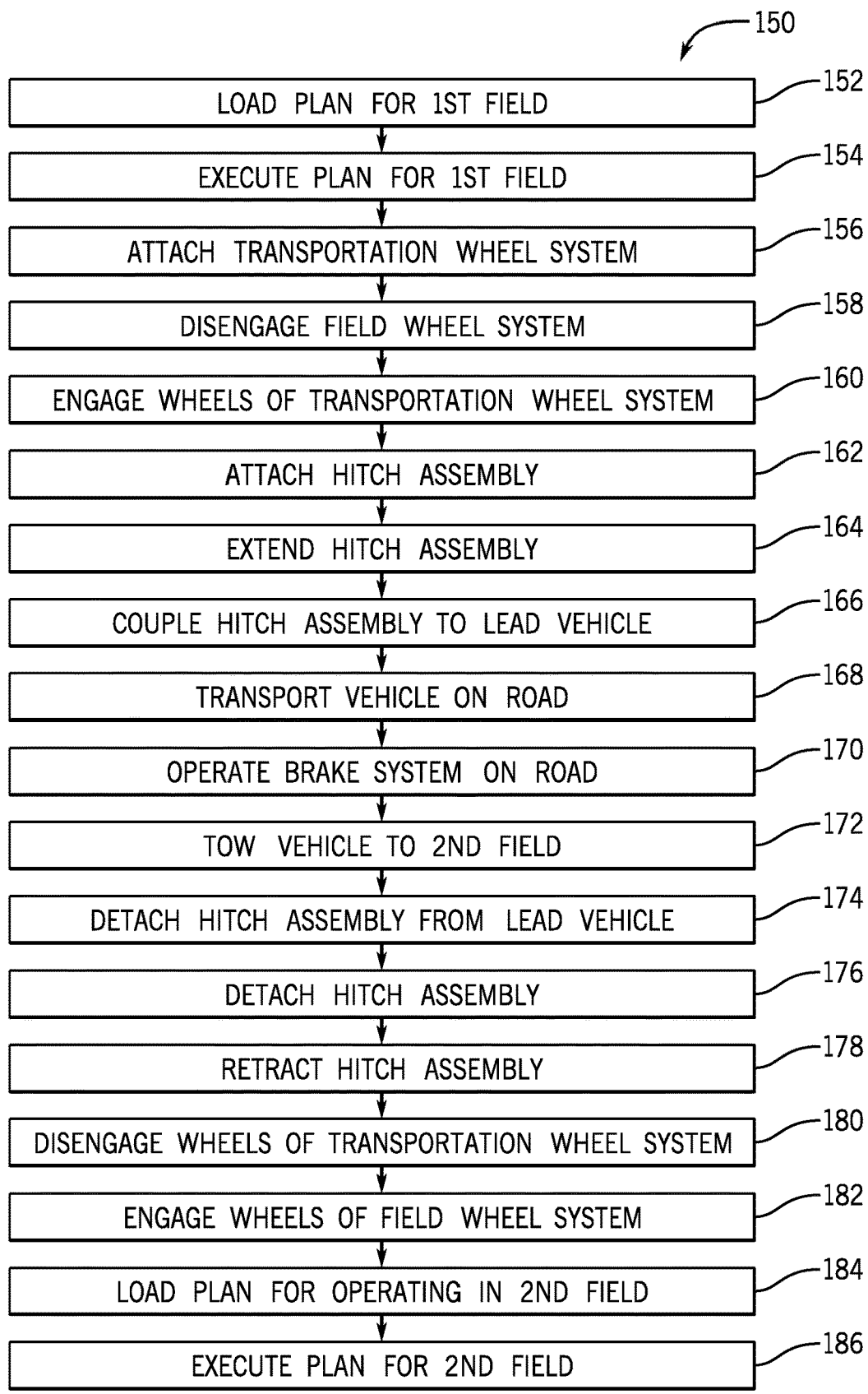
FIG. 5 is an embodiment of a method of operating the autonomous work vehicle.

As described above, the second autonomous agricultural vehicle 99 may be operated in the autonomous control mode while in a field to execute a plan for one or more agricultural operations. Additionally, the autonomous agricultural vehicle may be operated in the transportation mode to be transported by a lead vehicle without a trailer on public roads in compliance with local rules and regulations. FIG. 5 illustrates an embodiment of a method 150 of operating the autonomous work vehicle in the autonomous control mode and the transportation mode.

The autonomous work vehicle may load (block 152) a first plan for one or more agricultural operations in a first field. The first plan may have been received from a base unit, as described above with FIG. 4. Additionally, or in the alternative, the first plan may be loaded directly to the control system in the first field, or loaded to the control system prior to transportation of the autonomous work vehicle to the first field. In the first field, the autonomous work vehicle operating in the autonomous work vehicle mode may execute (block 154) the first plan to perform the one or more agricultural operations. In the autonomous work vehicle mode, the field wheel system engages with the first field and drives the autonomous work vehicle across the first field while executing the first plan. In some embodiments, the first plan may utilize one or more agricultural implements coupled to the autonomous work vehicle.

In some embodiments, a transportation wheel system is attached (block 156) to the autonomous work vehicle. That is, the transportation wheel system may be a removable system that is not coupled to the autonomous work vehicle while executing the first plan in the autonomous control mode. For example, the transportation wheel system may be attached to the autonomous work vehicle after executing the first plan for the first field. During a transition from the autonomous control mode to the transportation mode, the field wheel system may be disengaged (block 158) from the ground, and the transportation wheel system may be engaged (block 160) with the ground. In some embodiments, the autonomous work vehicle may autonomously disengage (block 158) the field wheel system and engage (block 160) the transportation wheel system. In some embodiments, an operator may adjust the field wheel system and/or the transportation wheel system to transition the autonomous work vehicle between the autonomous control mode and the transportation mode. As discussed above, the wheel systems may be transitioned between modes via electric, pneumatic, or hydraulic systems that couple wheels to the chassis of the autonomous work vehicle. In some embodiments, the transportation wheel system may be engaged (block 160) by rotating two or more transportation wheels from a storage position to a ground engaging position. In some embodiments, the field wheels of the field wheel system may have a sufficient speed rating such that the transportation wheel system and the blocks 156, 158, and 160 may be omitted.

In some embodiments, a hitch assembly is attached (block 162) to the autonomous work vehicle. That is, the hitch assembly may be a removable hitch assembly that is not coupled to the autonomous work vehicle while executing the first plan in the autonomous control mode. During a transition from the autonomous control mode to the transportation mode, the hitch assembly may be extended (block 164) from a storage position to a towing position. In some embodiments, the autonomous work vehicle may autonomously extend the hitch assembly to the towing position via an electric, pneumatic, or hydraulic system coupled to the hitch assembly and the chassis of the autonomous work vehicle. In some embodiments, the hitch assembly may be permanently disposed in an extended position on the autonomous work vehicle, such that blocks 162 and 164 may be omitted.

The hitch assembly is coupled (block 166) to the lead vehicle. The hitch assembly may be a ball hitch, a 5-point hitch, a gooseneck hitch, and so forth. Coupling the hitch assembly to the lead vehicle may include coupling one or more of a brake system, a lighting system, and a control system to the lead vehicle. In some embodiments, the brake system and/or the lighting system of the autonomous work vehicle may be electrically actuated via signals received from the lead vehicle. In some embodiments, the brake system and/or the lighting system of the autonomous work vehicle may be inertially actuated via relative movement of the autonomous work vehicle with respect to the lead vehicle.

When the autonomous work vehicle is coupled to the lead vehicle via the hitch assembly and the appropriate wheels system is engaged with the ground, the autonomous work vehicle is transitioned to the transportation mode. As described above, the autonomous work vehicle in the transportation mode may be towed by the lead vehicle without a trailer in compliance with local rules and regulations for public roads. The lead vehicle transports (block 168) the autonomous work vehicle on a public road without a trailer. In some embodiments, the tires of the wheel system engaged with the ground in the transportation mode have a speed rating that facilitates transport on the public road via the lead vehicle at speeds greater than 10, 15, 25, 35, 45, 55, or 70 miles per hour. During transport, the brake system of the autonomous work vehicle may be actuated (block 170) to slow the autonomous work vehicle based on input from the lead vehicle. The input may include, but is not limited to, an electrical signal from the lead vehicle to the autonomous work vehicle, relative movement between the autonomous work vehicle and the lead vehicle, or any combination thereof.

The lead vehicle tows (block 172) the autonomous work vehicle to a second field. Once at the second field, the autonomous work vehicle may be transitioned from the transportation mode to the autonomous control mode. In the second field (or a headland of the second field), the hitch assembly is detached (block 174) from the lead vehicle. The towing connection and any electrical or hydraulic connections of the towing assembly are decoupled from the lead vehicle when the hitch assembly is detached (block 174). In some embodiments, the removable hitch assembly itself is removed (block 176) from the autonomous work vehicle. In some embodiments, the hitch assembly is retracted (block 178) from the extended position to the storage position.

In some embodiments, the transportation wheels of the transportation wheel system are disengaged (block 180) from the ground and the field wheels of the field wheel system are engaged (block 182) with the ground in the second field. In some embodiments, the autonomous work vehicle may autonomously disengage (block 180) the transportation wheel system and engage (block 182) the field wheel system. An operator may adjust the field wheel system and/or the transportation wheel system to transition the autonomous work vehicle between the autonomous control mode and the transportation mode. In some embodiments, the field wheels of the field wheel system may have a sufficient speed rating such that the blocks 180 and 182 of the method 150 that are related to a separate transportation wheel system may be omitted.

In the second field, the autonomous work vehicle may load (block 184) a plan for one or more agricultural operations in the second field. The second plan may have been received from a base unit, as described above with FIG. 4. Additionally, or in the alternative, the second plan may be loaded directly to the control system in the second field, or loaded to the control system prior to or during transportation of the autonomous work vehicle to the second field. In the second field, the autonomous work vehicle operating in the autonomous work vehicle mode may execute (block 186) the second plan to perform the one or more agricultural operations. In the autonomous work vehicle mode, the field wheel system engages with the second field and drives the autonomous work vehicle across the second field while executing the second plan. In some embodiments, the second plan may utilize one or more agricultural implements coupled to the autonomous work vehicle. After executing the second plan to perform the one or more agricultural operations, the autonomous work vehicle may be transported to another field. That is, one or more sequences of the steps of the method 150 may be repeated for an autonomous work vehicle to be utilized in multiple fields.

While the steps of the method 150 may be performed in the order described below and illustrated in FIG. 5, it is appreciated that some steps may be optional, and some sequences of steps may be performed in a different order. For example, an embodiment of the autonomous work vehicle with fixedly attached hitch assembly may omit steps related to attaching and detaching the hitch assembly. In a similar manner, an embodiment of the autonomous work vehicle with a field wheel system having wheels with a sufficient speed rating for operation on a public road, the autonomous work vehicle may not have a separate transportation wheel system to be engaged and disengaged.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. An autonomous work vehicle, comprising:
   a chassis;
   a power system disposed on the chassis and configured to power the autonomous work vehicle in an autonomous control mode;
   a field wheel system coupled to the chassis and the power system, wherein the field wheel system is configured to drive the autonomous work vehicle in a field in the autonomous control mode; and
   a hitch assembly disposed on the chassis, wherein the hitch assembly is configured to couple to a lead vehicle when the autonomous work vehicle is in a transport mode, and field wheels of the field wheel system are configured to disengage from the ground when the autonomous work vehicle is in the transport mode.

2. The autonomous work vehicle of claim 1, comprising a transportation wheel system coupled to the chassis, wherein transportation wheels of the transportation wheel system have a first speed rating of greater than 20 miles per hour, and the field wheels of the field wheel system have a second speed rating of less than 20 miles per hour.

3. The autonomous work vehicle of claim 2, wherein the transportation wheel system comprises a retractable wheel system configured to be arranged in a storage position and a ground engaging position, wherein the retractable wheel system is retracted in the storage position when the autonomous work vehicle is in the autonomous control mode, the retractable wheel system is extended in the ground engaging position when the autonomous work vehicle is in the transport mode, and the field wheels of the field wheel system do not contact the ground while the retractable wheel system is extended in the ground engaging position.

4. The autonomous work vehicle of claim 2, wherein the transportation wheel system comprises a detachable transportation system configured to be attached to the chassis with a plurality of fasteners in the transport mode and detached from the chassis in the autonomous control mode.

5. The autonomous work vehicle of claim 1, comprising a lighting system coupled to the hitch assembly, wherein the lighting system comprises a plurality of brake lights configured to operate in the transport mode in response to a brake signal from the lead vehicle.

6. The autonomous work vehicle of claim 1, wherein the hitch assembly is integrated with the chassis of the autonomous work vehicle, and the hitch assembly is configured to couple to a pull hitch of the lead vehicle, a fifth-wheel hitch of the lead vehicle, or a gooseneck hitch of the lead vehicle.

7. The autonomous work vehicle of claim 1, wherein the hitch assembly comprises a retractable hitch assembly, wherein the retractable hitch assembly is arranged in a retracted position in the autonomous control mode, and the retractable hitch assembly is arranged in an extended position in the transport mode.

8. The autonomous work vehicle of claim 1, wherein the field wheel system comprises a plurality of electric drive motors configured to drive the autonomous work vehicle in the field in the autonomous control mode, wherein the plurality of electric drive motors comprise a brake system for the autonomous work vehicle in the transport mode.

9. The autonomous work vehicle of claim 1, comprising a brake system coupled to the hitch assembly, wherein the brake system is configured to decelerate the autonomous work vehicle in the transport mode in response to a brake signal from the lead vehicle.

10. The autonomous work vehicle of claim 1, comprising a transportation wheel system coupled to the chassis, wherein transportation wheels of the transportation wheel system have a first speed rating greater than a threshold speed rating, and the field wheels of the field wheel system have a second speed rating lower than the threshold speed rating.

11. An autonomous work vehicle, comprising:
    a chassis;
    a field wheel system coupled to the chassis, wherein the field wheel system is configured to support the autonomous work vehicle in a field in an autonomous control mode;
    a transportation wheel system coupled to the chassis, wherein the transportation wheel system is configured to support the autonomous work vehicle on a road in a transport mode, wherein the transportation wheel system comprises a retractable wheel system configured to be arranged in a storage position and a ground engaging position, wherein the retractable wheel system is arranged in the storage position when the autonomous work vehicle is in the autonomous control mode, and the retractable wheel system is arranged in the ground engaging position when the autonomous work vehicle is in the transport mode; and a first hitch assembly disposed on the chassis, wherein the first hitch assembly is configured to couple to a lead vehicle in the transport mode, wherein the first hitch assembly comprises a retractable hitch assembly, wherein the retractable hitch assembly is arranged in a retracted position in the autonomous control mode, and the retractable hitch assembly is arranged in an extended position in the transport mode.

12. The autonomous work vehicle of claim 11, comprising:
a lighting system coupled to the first hitch assembly, wherein the lighting system comprises a plurality of brake lights configured to operate in the transport mode in response to a brake signal from the lead vehicle; and
a braking system coupled to the first hitch assembly and the transportation wheel system, wherein the braking system is configured to operate in the transport mode to engage brakes of the transportation wheel system in response to the brake signal.

13. The autonomous work vehicle of claim 11, wherein the first hitch assembly comprises a housing configured to receive the retractable hitch assembly in the retracted position in the autonomous control mode.

14. The autonomous work vehicle of claim 11, comprising a second hitch assembly disposed on the chassis opposite the first hitch assembly, wherein the second hitch assembly is configured to couple to a second autonomous vehicle in the transport mode.

15. A method of transporting an autonomous work vehicle, comprising:
engaging wheels of a transportation wheel system of the autonomous work vehicle with a road to support the autonomous work vehicle on the road by:
attaching the transportation wheel system to a chassis of the autonomous work vehicle; and
disengaging a field wheel system of the autonomous work vehicle with from a field, wherein the field wheel system is configured to drive the autonomous work vehicle in the field;
coupling a hitch assembly of the autonomous work vehicle to a lead vehicle, wherein coupling the hitch assembly comprises coupling a brake system of the transportation wheel system to the lead vehicle; and
transporting, via the lead vehicle and the hitch assembly, the autonomous work vehicle on a road.

16. The method of claim 15, wherein the hitch assembly comprises a retractable hitch assembly, and the method comprises extending the retractable hitch assembly from a retracted position to a towing position, and coupling the hitch assembly of the autonomous work vehicle to the lead vehicle comprises coupling the retractable hitch assembly in the towing position to a hitch of the lead vehicle.

17. The method of claim 15, wherein the hitch assembly comprises a detachable hitch assembly, and the method comprises removably coupling the detachable hitch assembly to a chassis of the autonomous work vehicle prior to coupling the detachable hitch assembly to a hitch of the lead vehicle.

18. The method of claim 15, wherein the field wheel system comprises electric drive motors configured to drive the autonomous work vehicle in the field, and the brake system comprises the electric drive motors.

19. The method of claim 15, comprising:
operating the autonomous work vehicle in a first field autonomously prior to coupling the hitch assembly to the lead vehicle;
decoupling the hitch assembly of the autonomous work vehicle from the lead vehicle after transporting the autonomous work vehicle to a second field;
disengaging the transportation wheel system from the road after transporting the autonomous work vehicle to the second field;
engaging the field wheel system of the autonomous work vehicle with the second field; and
operating the autonomous work vehicle in the second field autonomously.

20. The method of claim 15, wherein transporting the autonomous work vehicle on the road comprises transporting the autonomous work vehicle without loading the autonomous work vehicle on a trailer coupled to the lead vehicle.

* * * * *